US012793970B2

(12) United States Patent
Chang et al.

(10) Patent No.: US 12,793,970 B2
(45) Date of Patent: Nov. 10, 2026

(54) NEGATIVE ELECTRODE MATERIAL FOR SECONDARY BATTERY, AND PREPARATION METHOD THEREOF

(71) Applicant: OCI COMPANY LTD., Seoul (KR)

(72) Inventors: Joonhyun Chang, Seongnam-si (KR); Minho Noh, Seongnam-si (KR); Minkyung Oh, Seongnam-si (KR); Eunok Chi, Seongnam-si (KR)

(73) Assignee: OCI COMPANY LTD., Seoul (KR)

( * ) Notice: Subject to any disclaimer, the term of this patent is extended or adjusted under 35 U.S.C. 154(b) by 196 days.

(21) Appl. No.: 18/715,249

(22) PCT Filed: Nov. 29, 2022

(86) PCT No.: PCT/KR2022/019115
§ 371 (c)(1),
(2) Date: Dec. 13, 2024

(87) PCT Pub. No.: WO2023/101372
PCT Pub. Date: Jun. 8, 2023

(65) Prior Publication Data

US 2025/0125341 A1 Apr. 17, 2025

(30) Foreign Application Priority Data

Dec. 1, 2021 (KR) ........................ 10-2021-0169867

(51) Int. Cl.
*H01M 4/36* (2006.01)
*H01M 4/38* (2006.01)
(Continued)

(52) U.S. Cl.
CPC ........... *H01M 4/366* (2013.01); *H01M 4/386* (2013.01); *H01M 4/583* (2013.01); *H01M 4/622* (2013.01); *H01M 4/625* (2013.01)

(58) Field of Classification Search
CPC ...... H01M 4/366; H01M 4/386; H01M 4/583; H01M 4/622; H01M 4/625; H01M 4/0471; H01M 4/134; H01M 4/1395
(Continued)

(56) References Cited

U.S. PATENT DOCUMENTS 7,618,678 B2 * 11/2009 Mao .................... H01M 4/0471
427/212
9,315,882 B2 * 4/2016 Lee ....................... H01M 4/366
(Continued)

FOREIGN PATENT DOCUMENTS

CN 103311514 A 9/2013
CN 103633295 A 3/2014
(Continued)

OTHER PUBLICATIONS

Notice of Allowance dated Jan. 6, 2025 for corresponding Korean Patent Application No. 10-2021-0169867, along with an English translation (3 pages).

(Continued)

*Primary Examiner* — Brian K Talbot
(74) *Attorney, Agent, or Firm* — Hauptman Ham, LLP

(57) ABSTRACT

The present invention provides a method for preparing a negative electrode material for a secondary battery, comprising a high-quality nano-silicon-carbon composite material formed by uniformly and densely coating the surface of nano-silicon particles with a pitch. Further, the present invention provides a negative electrode material, for a secondary battery, prepared by the method for preparing the negative electrode material for a secondary battery, and a secondary battery comprising same, in order to enhance the initial discharge capacity, initial efficiency, and life characteristics of the secondary battery.

13 Claims, 8 Drawing Sheets

(51) Int. Cl.
*H01M 4/583* (2010.01)
*H01M 4/62* (2006.01)

(58) Field of Classification Search
USPC .................................................... 427/58, 115
See application file for complete search history.

(56) References Cited

U.S. PATENT DOCUMENTS

| | | | | |
|---|---|---|---|---|
| 9,786,947 | B2 * | 10/2017 | Yushin | H01M 4/463 |
| 11,063,249 | B2 * | 7/2021 | Troegel | H01M 4/0471 |
| 12,202,731 | B2 * | 1/2025 | Choi | H01M 10/0525 |
| 2009/0130562 | A1 | 5/2009 | Mao et al. | |
| 2013/0334468 | A1 * | 12/2013 | Taniguchi | H01M 4/1395<br>252/502 |
| 2017/0047584 | A1 * | 2/2017 | Hwang | H01M 4/366 |
| 2017/0200948 | A1 * | 7/2017 | Kondo | H01M 4/386 |
| 2019/0177171 | A1 * | 6/2019 | Troegel | H01M 4/625 |
| 2019/0233294 | A1 * | 8/2019 | Moon | C01B 33/00 |
| 2020/0006759 | A1 * | 1/2020 | Ay | H01G 11/38 |
| 2020/0280062 | A1 * | 9/2020 | Shin | H01M 10/0525 |
| 2022/0048774 | A1 * | 2/2022 | Yan | C01B 32/05 |
| 2023/0047302 | A1 | 2/2023 | Kim et al. | |

FOREIGN PATENT DOCUMENTS

| | | | | |
|---|---|---|---|---|
| CN | 107394137 A | | 11/2017 | |
| CN | 108807861 A | | 11/2018 | |
| CN | 111312996 A | * | 6/2020 | H01M 4/625 |
| CN | 111653745 A | | 9/2020 | |
| CN | 112713262 A | * | 4/2021 | H01M 4/366 |
| CN | 112768667 A | | 5/2021 | |
| CN | 113571686 A | | 10/2021 | |
| JP | 2009-187924 A | | 8/2009 | |
| JP | 2010-33830 A | | 2/2010 | |
| JP | 2014-192064 A | | 10/2014 | |
| JP | 2016-66585 A | | 4/2016 | |
| KR | 10-2006-0111588 A | | 10/2006 | |
| KR | 10-2013-0139804 A | | 12/2013 | |
| KR | 10-2014-0118823 A | | 10/2014 | |
| KR | 10-2015-0113314 A | | 10/2015 | |
| KR | 10-2019-0091709 A | | 8/2019 | |
| KR | 10-2021-0027328 A | | 3/2021 | |
| KR | 10-2021-0080656 A | | 7/2021 | |

OTHER PUBLICATIONS

The Extended European Search Report dated Mar. 18, 2025 for corresponding European Patent Application No. 22901730.6 (8 pages).

Office Action issued on Jul. 18, 2025 for corresponding Japanese Patent Application No. 2024-531715, along with an English machine translation (17 pages).

International Search Report issued on Mar. 10, 2023, for corresponding International Patent Application No. PCT/KR2022/019115, along with an English translation (4 pages).

Written Opinion issued on Mar. 10, 2023, for corresponding International Patent Application No. PCT/KR2022/019115 (3 pages).

Office Action issued on Feb. 13, 2026 for corresponding Japanese Patent Application No. 2024-531715, along with an English machine translation (11 pages).

* cited by examiner

NEGATIVE ELECTRODE MATERIAL FOR SECONDARY BATTERY, AND PREPARATION METHOD THEREOF

TECHNICAL FIELD

The present disclosure relates to a method for preparing a negative-electrode material for a secondary battery that may improve initial discharge capacity (IDC), initial efficiency (ICE) and life characteristics of the secondary battery.

DESCRIPTION OF RELATED ART

Performance improvement of secondary batteries is based on components of a positive-electrode material, a negative-electrode material, and electrolyte.

Among the above components, a graphite-based material which is mainly used as the negative-electrode material is commercially available due to excellent electrochemical performance and low cost thereof. However, theoretical capacity thereof is limited to 370 mAh/g, and thus cannot be applied to high-capacity secondary batteries.

In order to overcome the above limitation, a non-graphite negative-electrode material such as silicon, tin, and germanium is emerging as an alternative material thereto. Among them, silicon has high theoretical capacity of 4000 to 4200 mAh/g which is almost 10 times or greater of that of graphite and thus is attracting attention as a material to replace graphite. However, although silicon has the high theoretical capacity, a large volume expansion of approximately 400% thereof occurs during the charging and discharging process, resulting in structural destruction of the silicon and short lifespan thereof.

As a way to alleviate the volume expansion of silicon, a scheme of preparing a composite material by mixing silicon and carbon material with each other has been devised. However, it is still difficult to effectively bind silicon to the carbon material.

Accordingly, a method has been developed in which slurry containing nano-silicon particles is formed into spherical powder particles, and then a pitch is coated, as a carbon material, on surfaces of the spherical powder particles. In this regard, in order to convert the nano-silicon into spherical powder particles, organic resin or aqueous resin that may bind nano-silicon to each other may be mixed therewith. The properties of the resin used may affect performance of each of the negative-electrode material and a finally manufactured secondary battery.

Specifically, when using the aqueous resin, water is added as a solvent. However, since an organic solvent is used when preparing nano-silicon particles, water as the solvent reacts with the nano-silicon to oxidize the same, causing problems related to dispersion and oxidation, which deteriorates the performance of the finally manufactured secondary battery.

When the organic resin is used, in a pitch coating step as a next process, the organic resin is also dissolved in the organic solvent contained in the pitch solution, destroying a shape of the particles made of silicon.

In a dry coating scheme without using the solvent, the coating is physically performed using a rubbing scheme. Thus, the spherical powder particles are destroyed, thereby producing a lot of fine powders, such that the uniformity of the coating is significantly reduced.

Therefore, it is necessary to develop a method for preparing a high-quality negative-electrode material for the secondary batteries that may solve the above problems and thus improve the initial discharge capacity, initial efficiency, and lifespan characteristics of the secondary battery.

DISCLOSURE

Technical Purpose

A purpose of the present disclosure is to provide a method for preparing a negative-electrode material for a secondary battery including a high-quality nano-silicon-carbon composite of a structure in which a pitch is uniformly and densely coated on a surface of the nano-silicon particles.

Another purpose of the present disclosure is to provide a negative-electrode material for a secondary battery which is prepared using the above method and thus improves the initial discharge capacity, initial efficiency and life characteristics of the secondary battery, and a secondary battery including the same.

The purposes of the present disclosure are not limited to the purposes mentioned above, and other purposes and advantages of the present disclosure as not mentioned may be understood based on descriptions as set forth below, and will be more clearly understood based on embodiments of the present disclosure. Furthermore, it will be readily apparent that the purposes and advantages of the present disclosure may be realized by solutions and combinations thereof indicated in the claims.

Technical Solution

In accordance with one aspect of the present disclosure, provided is a method for preparing a negative-electrode material for a secondary battery, the method comprising: mixing nano-silicon particles, an organic resin, and a conductive material with each other in a first solvent to prepare a slurry; drying the slurry to form spherical powder particles; curing the spherical powder particles; dissolving a high softening point pitch in a second solvent to prepare a pitch solution; coating the pitch solution on the cured spherical powder particles; and carbonizing the powder particles coated with the pitch solution.

In accordance with another aspect of the present disclosure, provided is a method for preparing a negative-electrode material for a secondary battery, the method comprising: mixing nano-silicon particles, an organic resin, a conductive material, and a curing agent with each other in a first solvent to prepare a slurry; drying the slurry to form spherical powder particles;

curing the spherical powder particles; dissolving a high softening point pitch in a second solvent to prepare a pitch solution; coating the pitch solution on the cured spherical powder particles; and carbonizing the powder particles coated with the pitch solution.

In accordance with still another aspect of the present disclosure, provided are a negative-electrode material for a secondary battery prepared by the preparing method as described above, and a secondary battery including a negative-electrode material for the secondary battery prepared by the preparing method as described above.

Technical Effect

According to the method for preparing the negative-electrode material for the secondary battery according to the present disclosure, the pitch may be uniformly and densely coated on the silicon particle surface, thereby preparing the negative-electrode material for the secondary battery including the high-quality silicon-carbon composite.

The negative-electrode material for the secondary battery as prepared according to the method for preparing the negative-electrode material for the secondary battery according to the present disclosure may be applied to the secondary battery, such that the initial discharge capacity, initial efficiency, and lifespan characteristics of the secondary battery may be improved.

In addition to the above-mentioned effects, the specific effects of the present disclosure are described below along with the descriptions of the specific details for carrying out the present disclosure.

DETAILED DESCRIPTIONS

Figure 1:
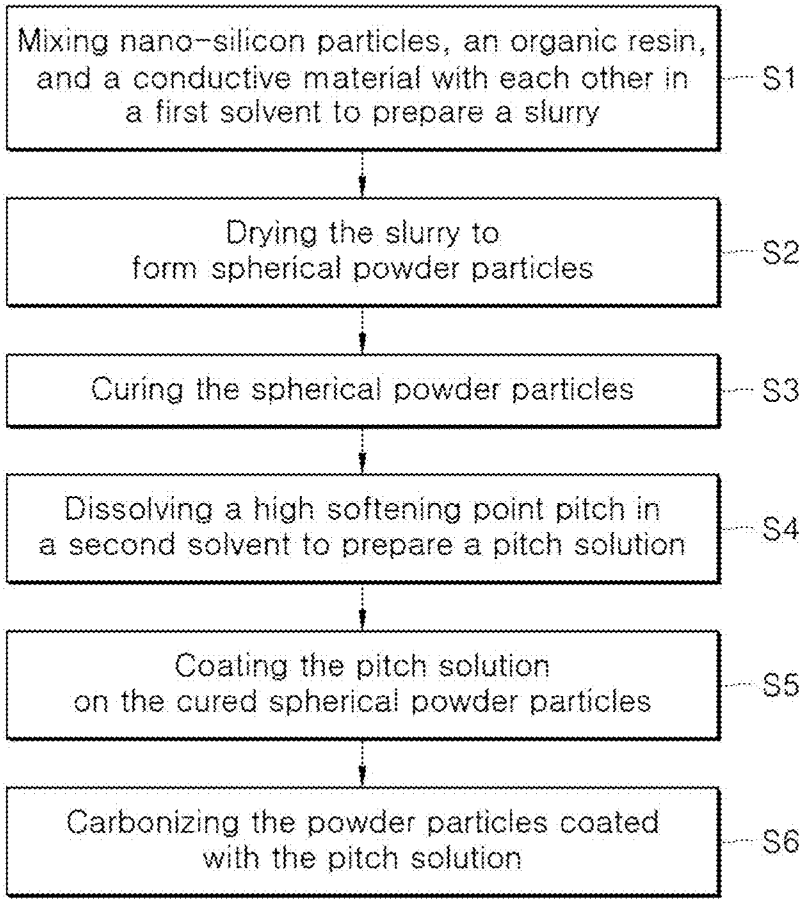
FIG. 1 is a flowchart showing a method for preparing a negative-electrode material for a secondary battery according to one aspect of the present disclosure.

The above-described purposes, features and advantages are described in detail below with reference to the drawings and embodiments, so that those skilled in the art in the technical field to which the present disclosure pertains may easily implement the technical ideas of the present disclosure. When describing the present disclosure, when it is determined that a detailed description of the known element or step related to the present disclosure may unnecessarily obscure the gist of the present disclosure, the detailed description thereof is omitted. Hereinafter, a preferred embodiment according to the present disclosure will be described in detail with reference to the attached drawings. In the drawings, identical reference numerals are used to indicate identical or similar components.

The description of those that may be sufficiently inferred technically by a person skilled in the art among the contents not described in the present disclosure will be omitted.

It will also be understood that when a first element or layer is referred to as being present "on" a second element or layer, the first element may be disposed directly on the second element or may be disposed indirectly on the second element with a third element or layer being disposed between the first and second elements or layers. It will also be understood that when a first element or layer is referred to as being present "under" a second element or layer, the first element may be disposed directly under the second element or may be disposed indirectly under the second element with a third element or layer being disposed between the first and second elements or layers.

It will be understood that when an element or layer is referred to as being "connected to", or "coupled to" another element or layer, it may be directly connected to or coupled to another element or layer, or one or more intervening elements or layers therebetween may be present. In addition, it will also be understood that when an element or layer is referred to as being "between" two elements or layers, it may be the only element or layer between the two elements or layers, or one or more intervening elements or layers therebetween may also be present.

Hereinafter, a method for preparing a negative-electrode material for a secondary battery according to the present disclosure will be described in detail.\

According to the present disclosure, in preparing a silicon-carbon composite as a negative-electrode material for a secondary battery, the limitations of the prior art when coating the pitch as a carbon material on the silicon particles may be overcome so as to significantly improve the uniformity and density of the pitch coating. Thus, a high-quality negative-electrode material for the secondary battery may be provided that may improve the performance of the secondary battery when the negative-electrode material is used in the secondary battery.

In particular, according to the present disclosure, the organic resin may be used when preparing the slurry containing silicon particles, and a curing process step may be performed before a pitch coating step. Thus, the organic resin does not dissolve in the organic solvent of the pitch solution used in the subsequent pitch coating process, thereby maintaining the shape of the spherical powder particles of the active material containing the silicon particles, such that the pitch coating property of the silicon surface may be significantly improved.

In this way, the method according to the present disclosure further includes the curing process after forming spherical powder particles with the slurry containing silicon particles, and before coating with the pitch solution. Thus, even when the pitch coating is performed in a liquid state, the organic resin may be prevented from dissolving in the organic solvent of the pitch solution.

In accordance with the present disclosure, the curing process is performed in two manners. In a first manner, the curing process is a thermal curing process. In a second manner, a curing agent is added when preparing the slurry containing silicon, such that the curing may occur for an appropriate period of time without applying heat thereto.

FIG. 1 is a flowchart of a negative-electrode active material preparing method according to one embodiment of the present disclosure. FIG. 1 relates to the preparing method in which, as described above, the curing process is the thermal curing process. Referring to FIG. 1, each of steps of the method is described below.

S1: Preparing Slurry by Mixing Nano-Silicon Particles, Organic Resin and Conductive Material with Each Other in First Solvent First, the slurry is prepared by mixing nano-silicon particles, an organic resin, and a conductive material with each other in a first solvent.

The first solvent may be selected as one that has excellent solubility at which nano-silicon particles, organic resin, and conductive materials are dissolved therein. For example, the first solvent may include ethanol, methanol, acetone, isopropyl alcohol, etc. Preferably, it may include ethanol.

The organic resin may be selected as a thermally curable resin that can be cured when heat is applied thereto. For example, the thermally curable resin may include phenol resin, epoxy resin, thermoset polyimide, polyester, polyurethane, melamine resin, amino resin, etc. Preferably, it may be a phenol resin. More preferably, it may be a resol type phenol resin with excellent thermally curable property.

The conductive material may be included to impart electrical conductivity to the negative-electrode material, and may be used without any limitations as long as it does not cause chemical change and is electrically conductive. For example, the conductive material may include at least one of carbon-based material, metal powder, metal fiber, metal oxide, and conductive polymer. For example, preferably, it may be a carbon-based material. More preferably, it may include carbon black.

A mixing ratio of the nano-silicon particles, the organic resin, and the conductive material in the slurry may be a general mixing ratio without any special limitations. For example, the mixing ratio of the nano-silicon particles:the organic resin:the conductive material may be in a range of 60 to 70:20 to 30:5 to 10.

Furthermore, an additive such as stearic acid may be added to the slurry so as to prevent oxidation of the nano-silicon particles, and to increase dispersibility thereof.

S2: Drying Slurry to Form Spherical Powder Particles

In order to convert the slurry containing the silicon into spherical powder particles, a drying step may be performed. The drying scheme is not particularly limited as long as the spherical powder particles can be formed by the scheme. However, preferably, the drying scheme may be spray drying.

In the spray drying, a liquid material is rapidly dried with hot air into a powder state. The spray drying may be performed using spray dryer equipment including an atomizer that converts the liquid material into fine particles, a heater, and a dryer.

The spray drying scheme may control a particle size and a particle shape based on various conditions such as experimental conditions and a liquid state, and may be suitable for mass production.

The average particle diameter of the spherical powder particles being prepared may be selected depending on the purpose of the negative-electrode material used, but may be preferably, for example, in a range of 5 to 10 μm.

S3: Curing Spherical Powder Particles

Before performing the step of coating the spherical powder particles including the nano-silicon particles as obtained in step S2 with the pitch, a step of curing the spherical powder particles may be performed. As a result, even when the pitch in the liquid form is coated on the spherical powder in a subsequent step, the organic resin may be prevented from dissolving in the organic solvent (hereinafter, corresponding to a second solvent in step S4) used to prepare the pitch solution, thereby maintaining the shape of the spherical powder particles.

As previously described, in the curing process step S3, one of the first and second manners may be selected. In the first manner, the curing process is a thermal curing process. In the second manner, the curing agent is added when preparing the slurry containing silicon, such that the curing may occur for an appropriate period of time without applying heat thereto.

In the first manner in which the curing process is the thermal curing process, it is preferable to use a thermally curable resin as the organic resin. For example, the thermal curing process may be performed at a temperature of 120 to 250° C. for 30 to 90 minutes. However, the present disclosure is not necessarily limited thereto. The curing temperature and the curing time may be adjusted depending on a type of the organic resin selected. The curing may occur according to a condensation reaction of the resin.

Otherwise, when the thermal curing process is omitted in the second manner, the curing agent should be added to the slurry. Thus, there is no need to apply the heat at the high temperature required for the thermal curing. However, an entire process should be completed within a curing time to prevent overcuring due to the curing agent. Thus, temporal limitation may occur. In this regard, the curing time varies depending on the amount of the curing agent added and the type of the curing agent, and may be adjusted according to knowledge in the art. Types of the above curing agents may include, for example, amine-based curing agents, acid anhydride-based curing agents, and amide-based curing agents. In this case, there is no need to use the thermally curable organic resin. Thus, the organic resin may be selected from a larger number of types of organic resins. For example, among phenol resins, a novolac-type phenol resin that does not exhibit the thermally curable property may be employed.

The curing process has different advantages depending on whether it is carried out in the thermally curing manner or the thermal curing is omitted due to the use of the curing agent. One of the first and second manners may be selected according to the purposes and conditions of each process.

S4: Dissolving High Softening Point Pitch in Second Solvent to Prepare Pitch Solution As described above, when the pitch is coated using a dry scheme, the shape of the spherical powder particles may be destroyed because the rubbing scheme is used. Further, the uniformity and density of the coating decreases. Therefore, in accordance with the present disclosure, in order to coat the pitch on the spherical powder particles containing silicon, the pitch may be dissolved in the second solvent to prepare the pitch solution. The second solvent may include, for example, tetrahydrofuran (THF), quinoline, toluene, pyridine, N-methyl pyrrolidone (NMP), xylene, chloroform, dimethyl sulfoxide, n-hexane, etc. Preferably, it may include tetrahydrofuran (THF).

In accordance with the present disclosure, in particular, the high softening point pitch (HSPP) is used because a pitch which is liquid at room temperature is not suitable due to low carbonization yield and low electrical conductivity after the carbonization due to its low molecular weight. Thus, it is desirable to dissolve the high softening point pitch in the second solvent to prepare the pitch solution.

S5: Coating Pitch Solution on Cured Spherical Powder Particles

The cured spherical powder particles and the high softening point pitch solution are mixed with each other to prepare a mixture, which in turn is subjected to evaporation so that the high softening point pitch is wet-coated on the spherical powder particles. At this time, the evaporation may be carried out in a double boiling manner at 35 to 40° C. using an evaporator.

S6: Carbonizing Powders Coated with Pitch

Carbonizing the powders coated with the high softening point pitch may allow the organic resin to be removed therefrom. Thus, a silicon-carbon composite in which the pitch is coated on the particle surface is obtained. For example, the carbonization may be performed under an inactive gas atmosphere (e.g., nitrogen atmosphere) by raising the temperature to 1000 to 1100° C. and then maintaining the 1000 to 1100° C. for about 1 hour. At this time, the temperature increase rate may be, for example, in a range of 5 to 10° C./min. When the carbonization temperature increases, an effect of removing hydrogen and oxygen in the organic resin may be greater. However, when it exceeds 1100° C., SiC may be produced. Thus, the carbonizing temperature may be in a range of 1000 to 1100° C.

The negative-electrode material for the secondary battery as prepared according to the method for preparing the negative-electrode material for the secondary battery in accordance with the present disclosure includes the silicon-carbon composite in which the silicon particles are uniformly and densely coated with the high softening point pitch. Thus, the negative-electrode material for the secondary battery as prepared according to the method for preparing the negative-electrode material for the secondary battery in accordance with the present disclosure may improve the initial discharge capacity, the initial efficiency, and the lifespan characteristics of the secondary battery when being applied to the secondary battery.

EXAMPLES

Hereinafter, the present disclosure is described in more detail based on examples and experimental examples. However, the following example and experimental example only illustrate the present disclosure, and the content of the present disclosure is not limited to the following example and experimental example. Thus, the following example should not be interpreted as limiting the present disclosure in any way.

1. Preparing Negative-Electrode Material for Secondary Battery

Present Example 1

65% by weight of nano-silicon particles (average value of $D_{50}$ being 111 nm, and average value of $D_{90}$ being 158 nm), 18% by weight of stearic acid, 10% by weight of resol-type phenolic resin (Kangnam Chemical Company, KC-4300N) as the organic resin, and 7% by weight of carbon black (Imerys Graphite & Carbon, Super-P product) as the conductive material were mixed each other in ethanol to prepare the slurry (solid content 20%).

Then, the slurry was spray-dried to prepare spherical powder particles with a size of 5 to 10 μm (average value of $D_{50}$: 7.255 μm). Then, heat was applied to the spherical powder particles at 150° C. for 1 hour to perform the thermal curing according to the condensation reaction of the resin.

Meanwhile, the high softening point pitch (HSPP, OCI) was dissolved in tetrahydrofuran (THF) to prepare a pitch solution. The spherical powder particles were added to the pitch solution to prepare a mixed solution. At this time, a mixing ratio was 32.4 parts by weight of the pitch solution relative to 100 parts by weight of the spherical powder particles. Then, the mixed solution was subjected to evaporation in a double boiling manner at 35 to 40° C. using an evaporator. Thus, the pitch was wet-coated on the spherical powder particles.

Next, under a nitrogen atmosphere, the temperature was raised to 1000 to 1100° C. at a rate of 5° C./min and the 1000 to 1100° C. was maintained for 1 hour to carbonize the spherical powder particles coated with the pitch, thereby ultimately preparing the negative-electrode material for the secondary battery.

Comparative Example 1

A negative-electrode material for a secondary battery was prepared in the same way as Present Example 1 except that dextrin resin as an aqueous resin was used instead of the resol-type phenol resin as an organic resin, and water instead of ethanol was used as a solvent, and the thermal curing was not performed.

Comparative Example 2

A negative-electrode material for a secondary battery was prepared in the same way as Present Example 1 except that the thermal curing was not performed.

2. Evaluation of Surface of Negative-Electrode Material

2-1. SEM Image Observation

Figure 2A:
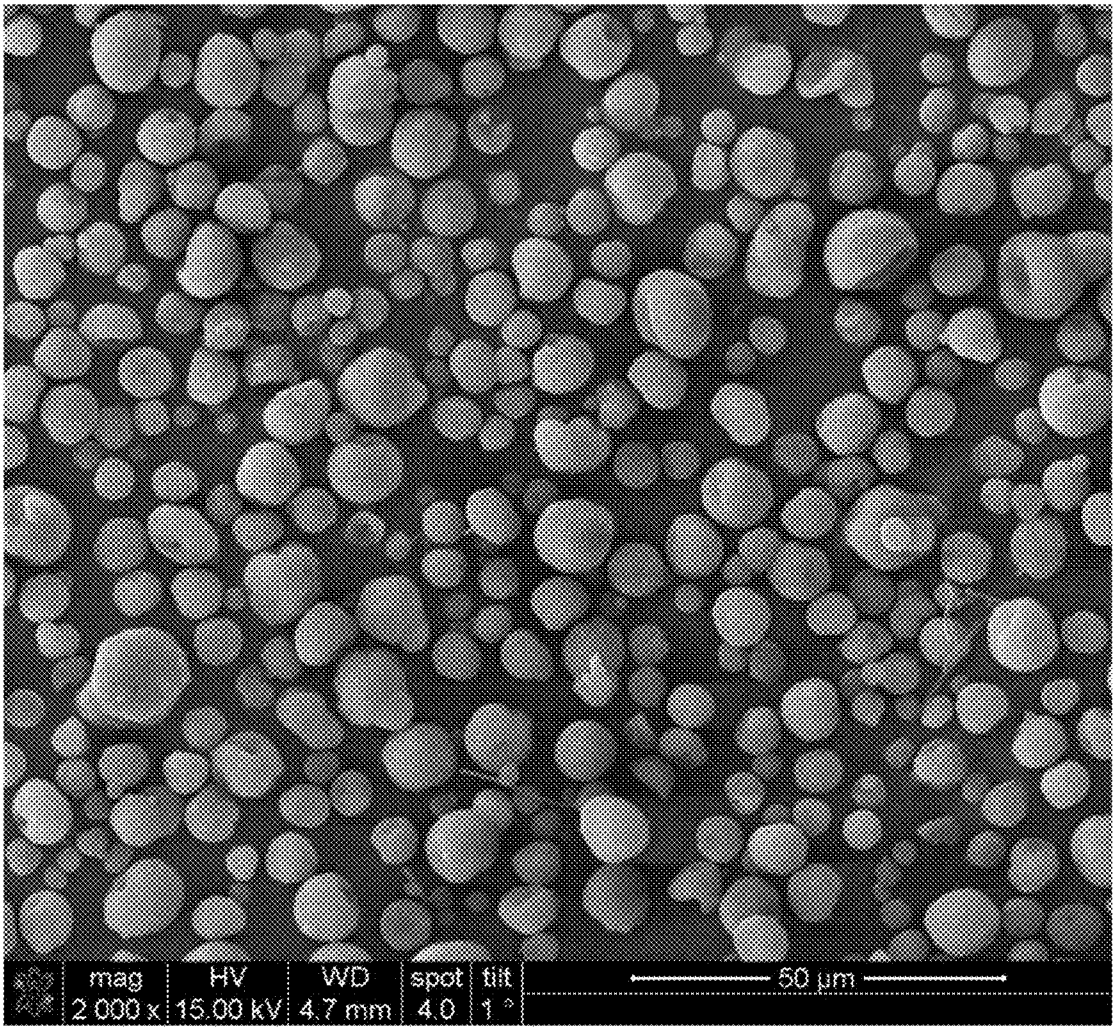
FIG. 2A, FIG. 3A, and FIG. 4A show SEM images of a silicon-carbon composite in which the pitch is coated on the surface of the silicon particles of Present Example 1, Comparative Example 1, and Comparative Example 2 according to the present disclosure, respectively.
Figure 3A:
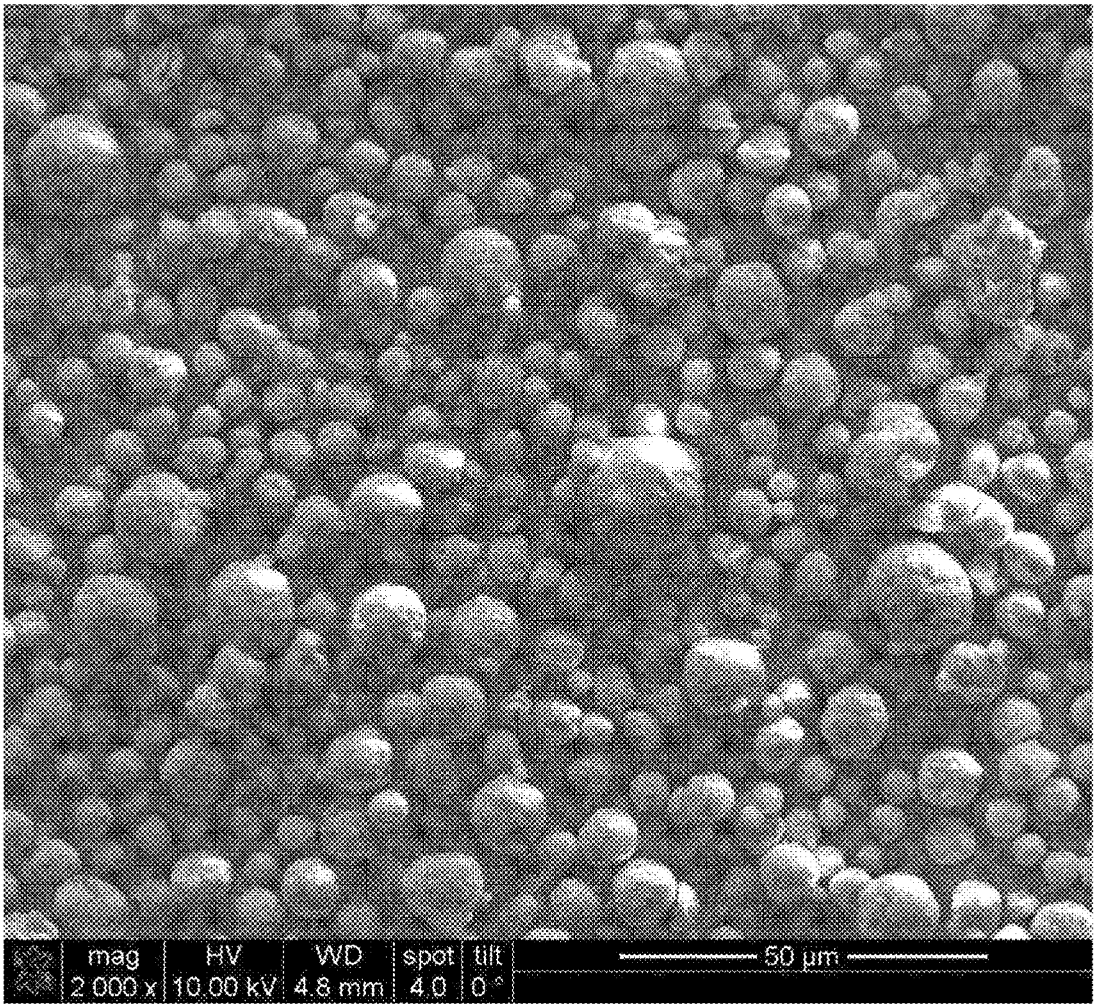
Figure 4A:
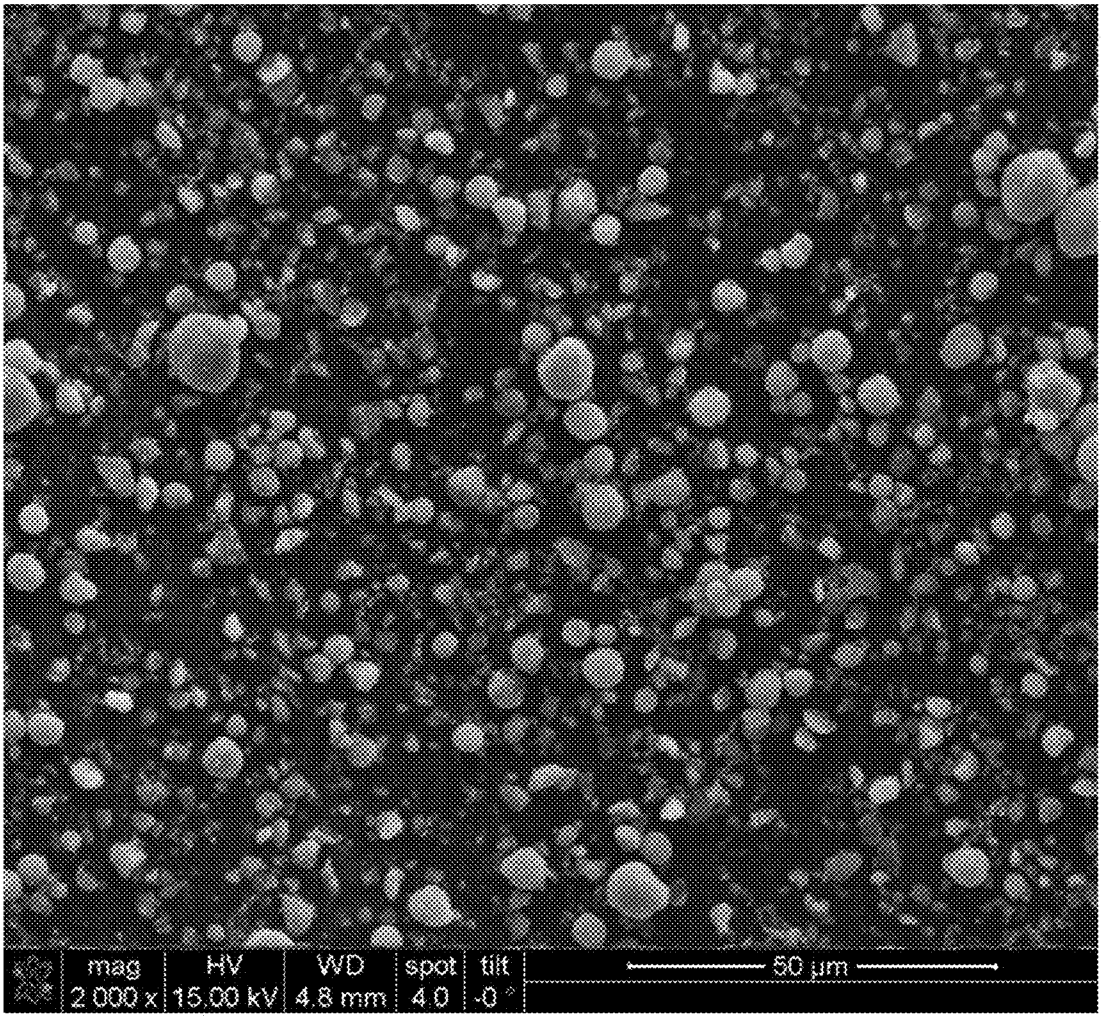

The cross-section of the negative-electrode material (silicon-carbon composite) prepared in each of Present Example 1 and Comparative Examples 1 to 2 was observed using SEM, and the SEM images are shown in FIG. 2A, FIG. 3A, and FIG. 4A, respectively.

As may be seen in FIG. 2A, a size of the silicon-carbon composite according to Present Example 1 was relatively uniform and a shape thereof was maintained as a round spherical shape. Thus, excellent shape maintenance before and after the pitch coating was achieved.

As may be seen in FIG. 3A, a size of the silicon-carbon composite according to Comparative Example 1 was non-uniform, and large particles and small fines were present in the mixed manner. The surface thereof was relatively rough.

Figure 3B:
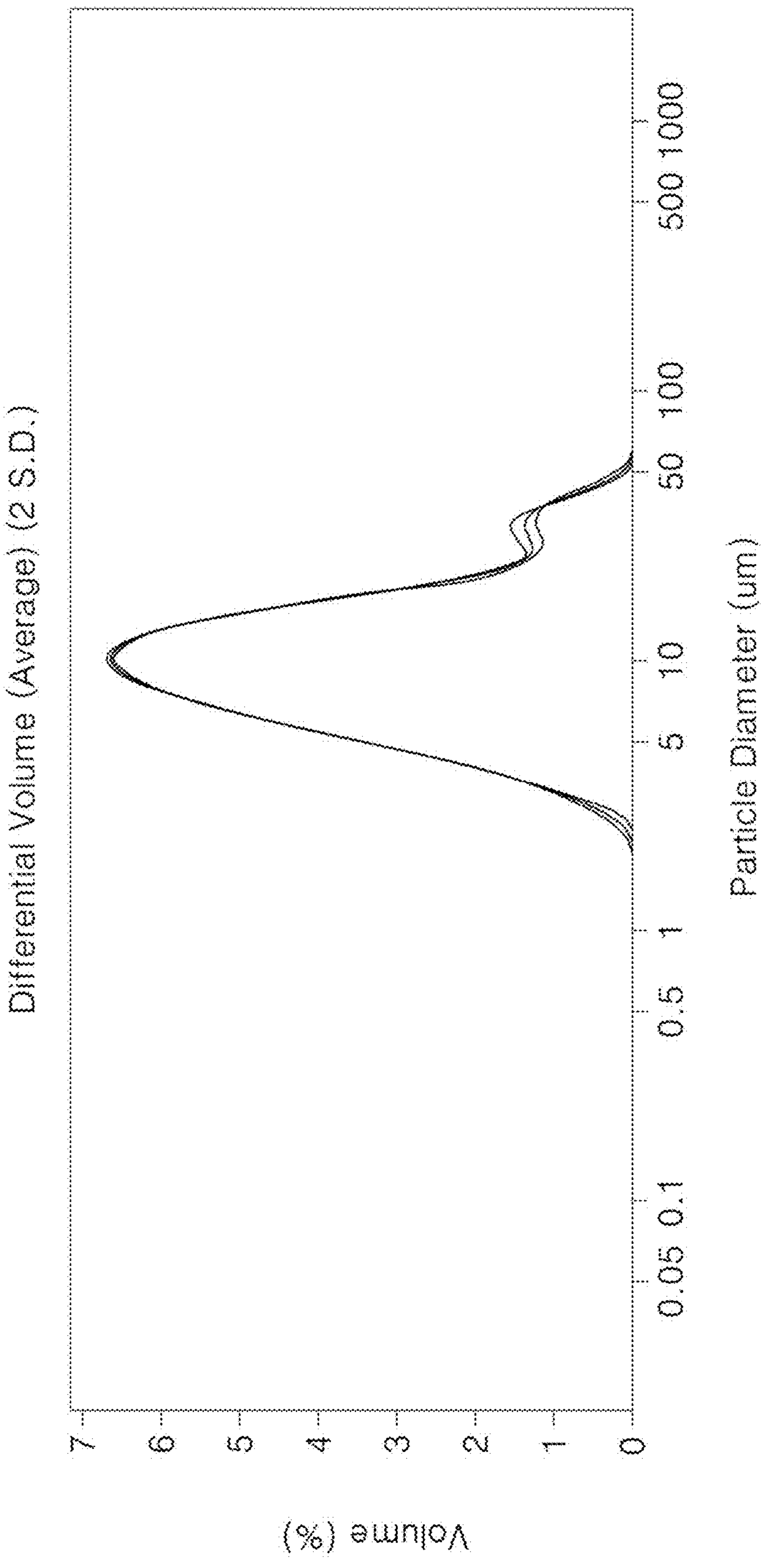

As may be seen in FIG. 3B, the silicon-carbon composite according to Comparative Example 2 could not be used as the negative-electrode material because the organic resin was dissolved and melted in THE, thereby destroying its spherical shape or clumping together.

2-2. PSA (Particle Size Analysis)

Figure 4B:
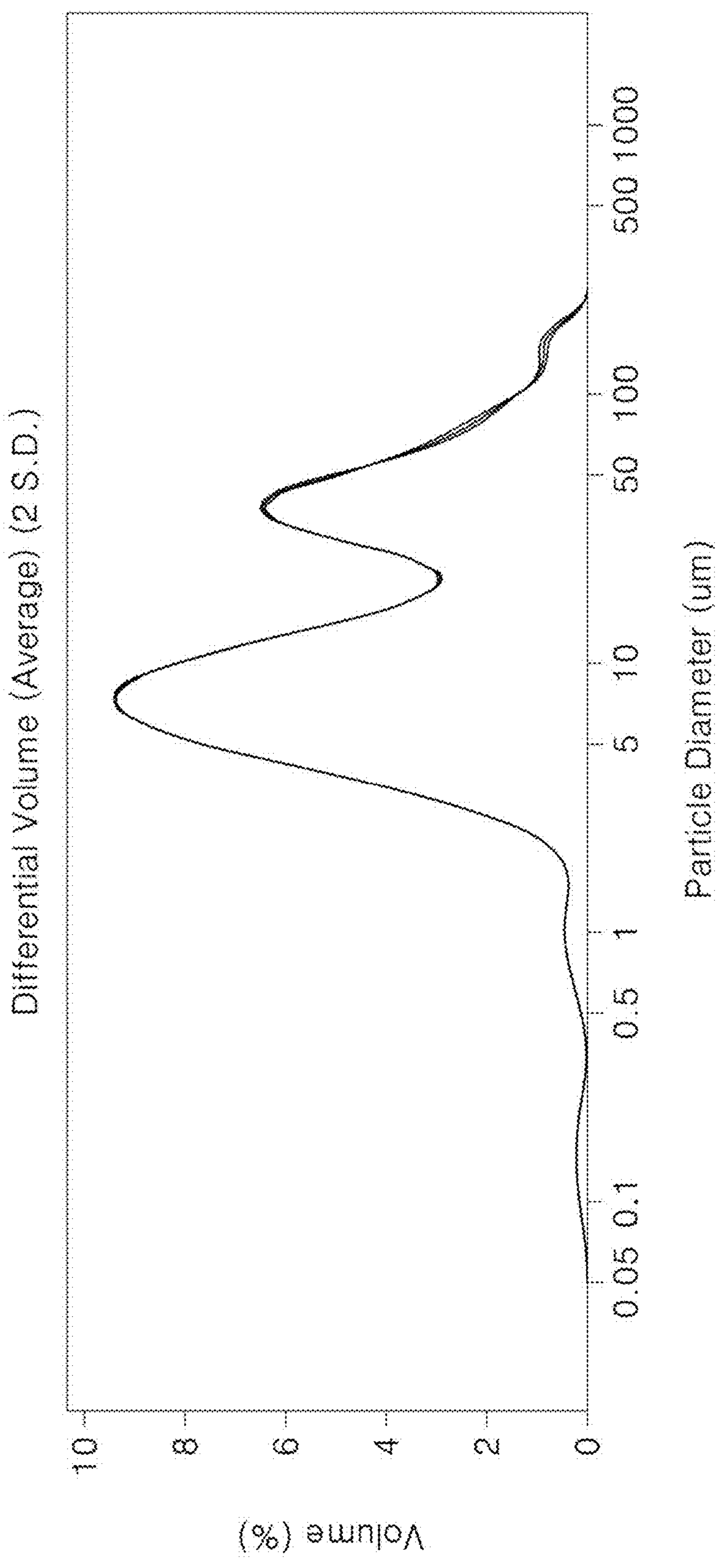

$D_{10}$, $D_{50}$, and $D_{90}$ of the negative-electrode material (silicon-carbon composite) prepared in each of Present Example 1 and Comparative Examples 1 to 2 were measured using 'BECKMAN COULTER life Sciences, LS 13 320 Particle Size Analyzer' as a PSA (Particle Size Analyzer) analysis equipment in a laser diffraction scheme. The measurements are shown in Table 1 below, and the particle size distribution was analyzed. At this time, the above measurement was performed three times, and the average diameter and the average volume were calculated and plotted on the horizontal and vertical axes, respectively, and the resulting graphs are shown in FIG. 2B, FIG. 3B, and FIG. 4B, respectively.

Furthermore, differential volume (average) (hereinafter abbreviated as "C.V.") was calculated based on the above graph. The C.V. value refers to a percentage (%) of (the standard deviation of the particle size/the average particle size). The smaller the C.V. value, the more uniform the size and narrower the size distribution. The C.V. value results are shown in Table 1 below. In order to achieve very high uniformity of the particle size, it is preferable that the C.V. value is 50% or smaller, or it is more preferable that the C.V. value is 40% or smaller.

Figure 2B:
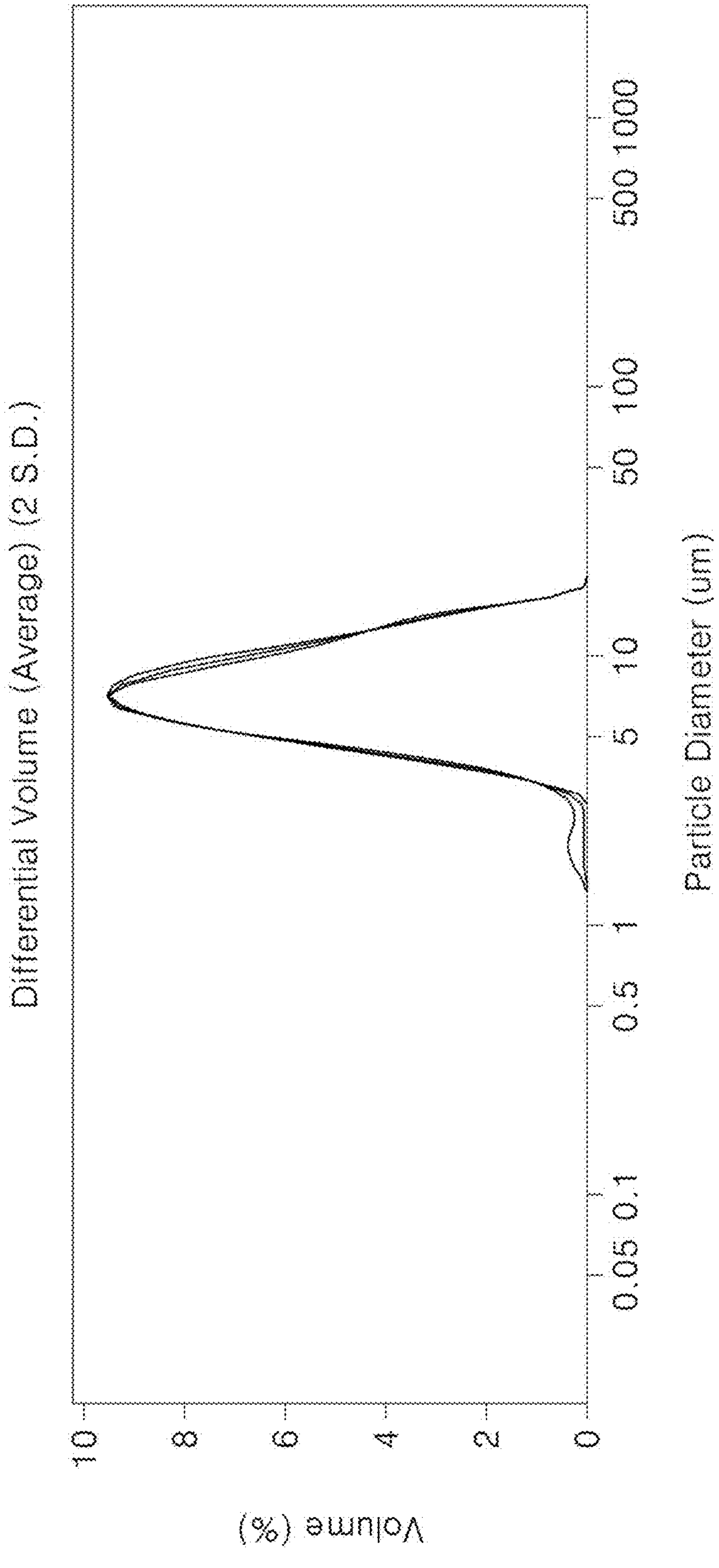
FIG. 2B, FIG. 3B, and FIG. 4B show PSA (Particle size analysis) graphs of the silicon-carbon composite in which the pitch is coated on the silicon particle surface of Present Example 1, Comparative Example 1, and Comparative Example 2 according to the present disclosure, respectively.

As a result of the analysis, in the graph of FIG. 2B directed to Present Example 1, the width of the peak was the narrowest and a single peak was observed. In the graph of FIG. 3B directed to Comparative Example 1, the width of the peak was wider than that in FIG. 2B, and two peaks were observed. In the graph in FIG. 4B directed to Comparative Example 2, the peak had the widest width and at least two three peaks were observed.

Furthermore, as may be seen in Table 1 below, Present Example 1 had the smallest particle size and the C.V. value thereof was the lowest and satisfied the target value of 50% or smaller, thus indicating that the uniformity was very high. On the other hand, each of Comparative Example 1 and Comparative Example 2 not only had the larger particle size, but also the C.V. value thereof was relatively high or very high, resulting in decrease in uniformity.

TABLE 1

| | Present Example 1 | Comparative Example 1 | Comparative Example 2 |
|---|---|---|---|
| $D_{10}$ (μm) | 4.525 | 4.825 | 3.652 |
| $D_{50}$ (μm) | 7.255 | 9.829 | 10.39 |
| $D_{90}$ (μm) | 12.00 | 21.39 | 55.75 |
| C.V. (%) | 37.0 | 65.8 | 124 |

3. Half-Cell Test

To analyze the electrochemical properties of the negative-electrode material for the secondary battery, a negative-electrode plate was manufactured using mixture powders of 15% by weight of the negative-electrode material as prepared in each of Present Example 1 and Comparative Example 1, and 85% by weight of artificial graphite as the active material. The negative-electrode plate was manufactured by preparing a slurry as a mixture of the active material, the conductive material (Imerys Graphite & Carbon, Super-P product), and a binder (CMC:SBR=3:7) at a weight ratio of 94:1:5, and casting the slurry on a copper foil and then vacuum-drying the casted slurry, and rolling the dried slurry. The manufactured negative-electrode plate together with a lithium metal as a counter electrode were used to manufacture a coin cell. Then, electrochemical performance of a half cell thereof was measured. The charging and discharging conditions were as follows: charging CC/CV: 0.01V/0.01 C, and discharging CC 1.5V, and the rate was 0.2 C.

Using a half-cell device TOSCAT-3100, each of initial charging efficiency (Initial coulombic efficiency (ICE)); discharge amount relative to initial charge amount), initial charging capacity (ICC), and initial discharge capacity (IDC) was measured. The measurement results are shown in Table 2 below. In order to check the life characteristics, the discharge specific capacity at 50 cycles was measured and graphed in FIG. 5 (horizontal axis: number of cycles, and vertical axis: specific capacity).

TABLE 2

| | ICE (%) | ICC (mAh/g) | IDC (mAh/g) |
|---|---|---|---|
| Present Example 1 | 87.3 | 649 | 567 |
| Comparative Example 1 | 86.5 | 657 | 569 |

Figure 5:
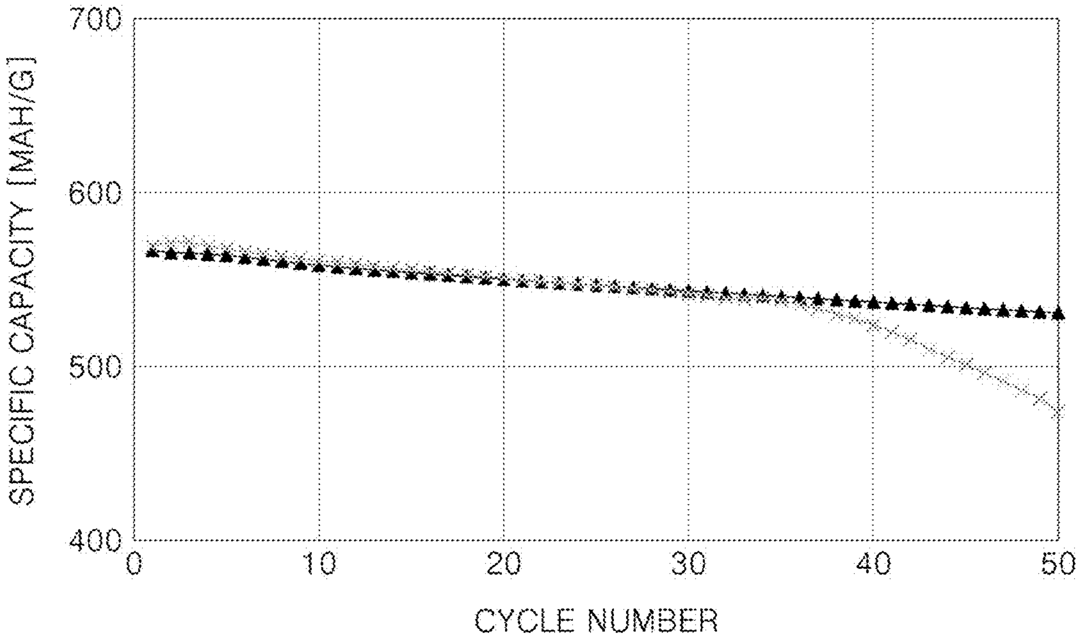
FIG. 5 shows a graph of a half-cell test result of each of Present Example 1 and Comparative Example 1 according to the present disclosure.

As may be seen in Table 2 and FIG. 5, when the negative-electrode material of Present Example 1 was applied, the electrochemical performance of the secondary battery was better than that when the negative-electrode material of Comparative Example 1 was applied.

The present disclosure has been described above with reference to illustrative drawings. However, the present disclosure is not limited to the embodiments and drawings disclosed in the present disclosure. It is obvious that various modifications may be made thereto by those skilled in the art within the scope of the technical idea of the present disclosure. In addition, even when the effect of the configuration of the present disclosure was not explicitly described while describing the embodiment of the present disclosure, it is natural that the predictable effect from the configuration should be recognized.

What is claimed is:

1. A method for preparing a negative-electrode material for a secondary battery, the method comprising:
mixing nano-silicon particles, an organic resin, and a conductive material with each other in a first solvent to prepare a slurry;
drying the slurry to form spherical powder particles;
curing the spherical powder particles to cause a condensation reaction of the organic resin;
dissolving a high softening point pitch in a second solvent to prepare a pitch solution,
wherein the high softening point pitch is a pitch that is not a liquid at room temperature;
coating the pitch solution on the cured spherical powder particles; and
carbonizing the powder particles coated with the pitch solution.

2. A method for preparing a negative-electrode material for a secondary battery, the method comprising:
mixing nano-silicon particles, an organic resin, a conductive material, and a curing agent with each other in a first solvent to prepare a slurry;
drying the slurry to form spherical powder particles;
curing the spherical powder particles at a temperature of 20 to 27° C. to cause a condensation reaction of the organic resin;
dissolving a high softening point pitch in a second solvent to prepare a pitch solution,
wherein the high softening point pitch is a pitch that is not a liquid at room temperature;
coating the pitch solution on the cured spherical powder particles; and
carbonizing the powder particles coated with the pitch solution.

3. The method of claim 1, wherein the first solvent includes at least one selected from a group consisting of ethanol, methanol, acetone and isopropyl alcohol.

4. The method of claim 1, wherein the organic resin includes at least one selected from a group consisting of phenol resin, epoxy resin, thermally curable polyimide, polyester, polyurethane, melamine resin, and amino resin.

5. The method of claim 1, wherein the conductive material includes carbon black.

6. The method of claim 1, wherein the drying is performed in a spray drying manner.

7. The method of claim 1, wherein an average particle diameter of the spherical powder particles is in a range of 5 to 10 μm.

8. The method of claim 1, wherein the second solvent includes at least one selected from a group consisting of tetrahydrofuran (THF), quinoline, toluene, pyridine, N-methyl pyrrolidone (NMP), xylene, chloroform, dimethyl sulfoxide, and n-hexane.

9. The method of claim 1, wherein the curing is performed in a thermally curing manner for 30 minutes or greater at a temperature of 120 to 250° C.

10. The method of claim 2, wherein the curing agent includes at least one selected from a group consisting of an amine-based curing agent, an acid anhydride-based curing agent, and an amide-based curing agent.

11. The method of claim 1, wherein the carbonization is performed at a temperature of 1000 to 1100° C.

12. A negative-electrode material for a secondary battery prepared by the preparing method of claim 1.

13. A secondary battery including a negative-electrode material for the secondary battery prepared by the preparing method of claim 1.

* * * * *